United States Patent
Woods

(10) Patent No.: US 10,245,665 B2
(45) Date of Patent: Apr. 2, 2019

(54) DEVICE AND METHOD FOR BROKEN TAP REMOVAL

(71) Applicant: Ray Fitzgerald Woods, Salem, OH (US)

(72) Inventor: Ray Fitzgerald Woods, Salem, OH (US)

(73) Assignee: Ray F. Woods, Salem, OH (US)

( * ) Notice: Subject to any disclaimer, the term of this patent is extended or adjusted under 35 U.S.C. 154(b) by 305 days.

(21) Appl. No.: 15/268,581

(22) Filed: Sep. 17, 2016

(65) Prior Publication Data

US 2018/0079020 A1   Mar. 22, 2018

(51) Int. Cl.
    *B23G 5/06* (2006.01)
    *B25B 27/18* (2006.01)

(52) U.S. Cl.
    CPC .............. *B23G 5/068* (2013.01); *B25B 27/18* (2013.01); *B23G 2200/42* (2013.01); *B23G 2240/12* (2013.01)

(58) Field of Classification Search
    CPC .. B23G 5/068; B23G 5/06; B23G 5/00; Y10T 29/49403; Y10T 29/49407; Y10T 29/49815; Y10T 29/53; Y10T 29/53596; Y10T 29/53657; Y10T 29/53683; Y10T 29/53796; Y10T 29/53843; Y10T 29/53909; Y10T 29/53952; Y10T 29/53957; Y10T 29/54
    See application file for complete search history.

(56) References Cited

U.S. PATENT DOCUMENTS

| | | | | |
|---|---|---|---|---|
| 1,670,574 | A * | 5/1928 | Howell | B25B 27/023 29/263 |
| 3,611,540 | A * | 10/1971 | Gibu | B25B 27/023 29/263 |
| 4,507,837 | A * | 4/1985 | Hinkle | B25B 27/023 29/262 |
| 4,724,608 | A * | 2/1988 | Parrott | B25B 27/023 29/253 |
| 4,831,702 | A * | 5/1989 | Vossbrinck | B23P 19/025 29/426.4 |
| 7,878,092 | B1 * | 2/2011 | Eby | B25B 7/02 81/112 |
| 2011/0061217 | A1 * | 3/2011 | Shevela | B25B 27/0035 29/235 |

* cited by examiner

*Primary Examiner* — Jason L Vaughan
*Assistant Examiner* — Amanda Kreiling

(57) ABSTRACT

A device and method for broken tap removal are provided herein. The tap includes a circular longitudinal cavity used for removal and coolant transport. A tap removal tool that is pre-formed to fit the tap's center hole and provides at least three points of contact with the broken tap portion to allow for ease in removing the broken tap.

2 Claims, 1 Drawing Sheet

DEVICE AND METHOD FOR BROKEN TAP REMOVAL

CLAIM FOR PRIORITY

The present application claims priority from provisional application No. 62/219,711 with the filing date of Sep. 17, 2015 and title of Device and Method for Broken Tap Removal.

BACKGROUND

1. Field

The present invention relates to a traditional tap used for cutting threads on an inside surface of a bored hole and more specifically extracting a broken tap out of the bored hole.

2. Description of Related Art

Conventional taps are defined as bottoming, taper, and plug taps. Some of these taps are solid, while others are formed with a longitudinal cavity used to transport coolant to the cutting portion of the tap. Taps have an exteriorly threaded portion interrupted by flutes varying in number from one to five. Opposite the fluted and exteriorly threaded portion of the tap used for threading a bored hole, is a shank having flats at it's distal end used to be engaged with a wrench or hand tool of the like or a chuck of an electrically or battery powered machine. In some cases the longitudinal cavity was also used as a means for removal in the event the tap is broken while in use leaving a portion of the tap in the bored hole. Prior art claims polygonal shaped cavities as in U.S. Pat. No. 4,762,444 titled "Screw Tap With Lubrication and Extraction Bores" and U.S. Pat. No. 2,335,741 titled "Tap For Cutting Internal Screw-Threads" used in conjunction with a provided tool for removal of a broken tap, in the same shape as the aforementioned polygonal cavity. U.S. Pat. No. 2,240,840 titled, Tap Construction claims a tap body with a longitudinally bored hole and separate core inserted into the bore. In this patent, Fischer claims if the body of the tap is broken while in use the core can be removed and the remaining tap can be collapsed with a drift and removed with tweezers. Other patents have claimed round through holes longitudinally positioned in the tap for the transport of fluid or coolant to the cutting portion of the tap as seen in U.S. Pat. No. 3,028,772 titled "Liquid Cooled Counter Boring Tool", U.S. Pat. No. 4,032,250 titled "Reamer Construction", U.S. Pat. No. 4,640,652 titled "Coolant Delivery System", U.S. Pat. No. 4,761,844 titled "Combined Hole Making and Threading Tool", U.S. Pat. No. 5,980,166 titled "Rotary Tool With Shank", U.S. Pat. No. 5,993,120 titled "Internal Thread-Producing Tool and Method, U.S. Pat. No. 6,524,034 titled "Tool Tip and Tool Body Assembly", U.S. Pat. No. 7,073,988 titled "Threaded Tool with Coolant Supply, and U.S. Pat. No. 7,533,114 titled "Thread Cutting Tap and a Method of It's Manufacture". While prior art has utilized a round bore as a means of transporting coolant through the tap to the cutting portion and addressed the issue of removing a broken tap by way of a polygonal cavity and removal tool of the same, it is more cost efficient and less time consuming to incorporate a round hole that is used for removal in the event a tap breaks in a bored hole. Prior art only offers at least one point of contact interiorly or exteriorly for removal of a broken tap.

Accordingly, it is evident that providing a tap with a longitudinal cavity being round in shape is easily manufactured, saving time and cost. Therefore it would be advantageous to provide a tap with a circular cavity used for coolant and broken tap removal. Furthermore, it is evident that a broken tap removal tool that provides at least three points of contact with the broken tap would be advantageous by aiding in removal of a broken tap.

BRIEF SUMMARY OF THE INVENTION

To alleviate the disadvantages of prior art, a tap is provided herein. The present invention comprises a conventional tap used for cutting threads inside a bored hole containing a longitudinal cavity used to transport coolant from a shank portion to the distal end where thread cutting work is being preformed. The longitudinal cavity is secondly used for removal of a broken tap from a bored hole. The longitudinal cavity of the present invention can extend from the shank to the distal end of the tap where the exterior threads and flutes are situated or can extend as a blind cavity from the tip of the threaded portion and stop just above the fluted or working portion of the tap. A portion of the round cavity is threaded at the tip of the working section of the tap.

A removal tool is also provided herein. The removal tool is constructed so as to make at least three points of contact with a broken tap to ease it's removal. The aforementioned removal tool is comprised of a bolt with accompanying nut as well as a machined threaded hole in the bottom flat surface of the bolt. The machined threaded hole is formed to accept a threaded rod. A body is slid around the bolt beneath the nut and the threaded rod protrudes from the bottom of the body. The body is formed with wrench flats and contains a lock assembly used to hold an interchangeable flute tab assembly at the bottom of the body. The interchangeable flute tab assembly is constructed of steel is hollow and has a round rubber bushing in which the flute tabs protrude through. The interchangeable flute tab assembly has at least one tab or more to slide into the flutes of the tap.

REFERENCE NUMERALS IN THE DRAWINGS

| | | | |
|---|---|---|---|
| 2 | Tap | 4 | Removal/Coolant Cavity |
| 6 | Internal Threaded Tip | 10 | Bolt |
| 12 | Nut | 14 | Flute Tab |
| 16 | Body | 18 | Rubber Bushing |
| 20 | Flute Tab Assembly | 22 | Broken Tap |
| 24 | Threaded Rod | 26 | Wrench Flats |
| 28 | Thread Forming Teeth | 30 | Lock Assembly |
| 32 | Shank | 34 | Removal Tool |

DETAILED DESCRIPTION OF THE INVENTION

Figure 1:
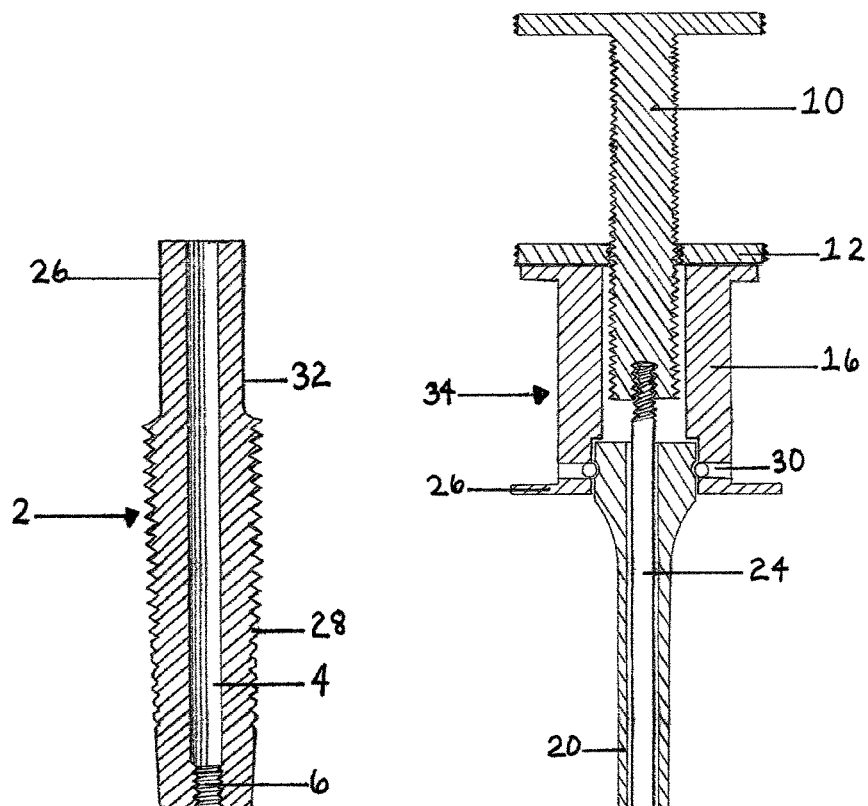
FIG. 1 is a cross sectional view of the current invention, a tap with a longitudinal cavity used for removal/lubricant transport.

FIG. 1 is a perspective view of the current invention, a conventional tap 2 with a longitudinal removal/coolant cavity 4. Taps 2 are made from metal and undergo a heat-treating process to further strengthen the metal of the tap. It is preferred that the present invention has the removal/ coolant cavity 4 incorporated into the tap prior to the heat-treating process but can be machined after the heat-treating process if necessary. The preferred shape of the removal/coolant cavity 4 is round and has an internal threaded tip 6 distal from the wrench flats 26 on the shank 32 therein. In FIG. 1, it can be seen that the removal/coolant cavity 4 runs longitudinally through the center of the tap and may be a through hole or a blind hole beginning at the tip with the thread forming teeth 28 and stop just above the fluted portion of the tap 2. If the tap 2 is compromised and breaks off in a bore during use, the removal tool 34 shown in FIG. 2 is used to remove the broken tap from the hole.

Figure 2:
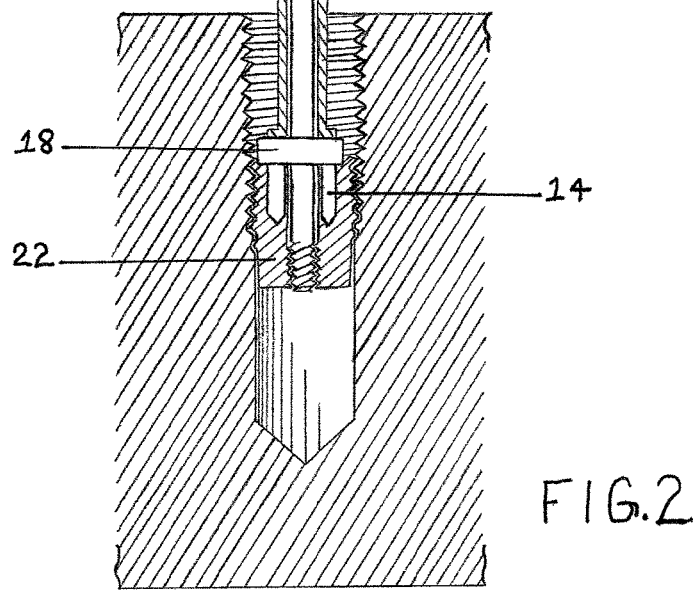
FIG. 2 is a cross sectional view of the broken tap and removal tool in use.

The removal tool 34, as seen in FIG. 2, is comprised of a bolt 10 with a nut 12, where the bolt 10 has a center hole machined and threaded in the bottom of the bolt 10 to accept a threaded rod 24. After the nut 12 is rotated onto the bolt 10, a hollow body 16 is slid over the bolt until it comes into contact with the nut 12 on the bolt 10. The threaded rod 24 that is rotated into the threaded bore of the bolt 10 protrudes out the bottom of the body 16. The end of the body 16 distal the bolt 10 and nut 12 contains a lock assembly 30 formed to accept an interchangeable flute tab assembly 20 which is made of steel and hollow allowing the threaded rod 24 to protrude out the bottom of the flute tab assembly 20. The portion of the body 16 containing the lock assembly 30 is formed externally to have wrench flats 26. The flute tab assembly 20 end distal the lock assembly 30 point of engagement, has at least one flute tab 14 used to slide into and engage the flute of a broken tap 22. The flute tab 14 is slid through a rubber bushing 18 and is retained by the flute tab 14. Because taps 2 are formed with a varying number of flutes, the removal tool 34 is made to interchange different flute tab assemblies 20 with varying numbers of flute tabs 14.

The method of removal is herein, in the event a tap 2 is broken off in a bore, the shank 32 portion is removed. The aforementioned removal tool 34 is inserted in the bored hole and remaining piece of broken tap 22, rotated with a wrench or hand tool of the like, on the head of the bolt 10. The threaded rod 24 is rotated into the internal threaded tip 6 of the broken tap 22. Next, the body 16 portion of the removal tool 34, with the correct flute tab assembly 20 is slid down the bolt 10 and into the flutes of the broken tap 22. The nut 12 is then rotated down the bolt 10 until it contacts the body 16 of the removal tool 34 and is sufficiently tightened to the body 16. This forces the rubber bushing 18 to engage the upper surface of the broken tap 22. The removal tool 34 now has at least three points of contact with the broken tap 22. The three points of contact include the threaded rod 24 in the threaded tip 6, the flute tabs 14 seated into the flutes, and the rubber bushing 18 in contact with the top of the broken tap 22. To complete the removal process, a wrench or hand tool of the like is engaged on the wrench flats 26 of the body 16 and rotated in the opposite direction in which the tap was applied to the bore until the broken tap 22 is removed. A new tap 2 can then be rotated into the bore and the thread cutting process can begin again.

The invention as described hereinabove, with the preferred embodiments, is not to be taken as limited to such, since variations thereof may be made without departing from the spirit and scope of the invention.

Having described my invention I claim:

1. A tap removal tool comprising:

A bolt with a head and distal threaded portion and a nut to engage on said threaded portion of the bolt, and said bolt having a longitudinally threaded blind bore in a flat bottom of said threaded portion therein, where said longitudinally threaded blind bore is to accept a threaded rod, and a hollow body is slid over said threaded portion of the bolt and just beneath the nut on said bolt, and said body having a distal end where a lock assembly is encompassed and said body distal end formed with an exterior wrench flats, where said lock assembly accepts an interchangeable flute tab assembly, and said interchangeable flute tab assembly is a hollow longitudinal shaft having at least one flute tab distal said lock assembly portion, and said flute tab is formed to engage in a tap flute, said flute tab retaining a rubber bushing, and said rubber bushing having an opening to accept said flute tab, and where said threaded rod protrudes beyond said distal end of the interchangeable flute tab assembly's said tabs.

2. A method for removing a broken tap providing:

An internal thread cutting tap being a shaft member having a head with engagement flats and shank portion with a distal end, the distal end having an external threaded portion and said threaded portion having at least one longitudinal flute interrupting said threads, and said tap having a circular longitudinal cavity, said circular longitudinal cavity having an internal threaded portion in the externally threaded and fluted end of the tap, said circular longitudinal cavity being a means for coolant transport and removal of a compromised tap, and a tap removal tool with a bolt with a head and distal threaded portion and a nut to engage on said threaded portion of the bolt, and said bolt having a longitudinally threaded blind bore in a flat bottom of said threaded portion therein, where said longitudinally threaded blind bore is to accept a threaded rod, and a hollow body is slid over said threaded portion of the bolt and just beneath the nut on said bolt, and said body having a distal end where a lock assembly is encompassed and said body distal end formed with an exterior wrench flats, where said lock assembly accepts an interchangeable flute tab assembly, and said interchangeable flute tab assembly is a hollow longitudinal shaft having at least one flute tab distal said lock assembly portion, and said flute tab is formed to engage in a tap flute, said flute tab retaining a rubber bushing, and said rubber bushing having an opening to accept said flute tab, and where said threaded rod protrudes beyond said distal end of the interchangeable flute tab assembly's said tabs, and where said tap breaks during use in a bore, and said shank portion is removed from said bore, and aforementioned removal tool's bolt head is rotated with a wrench or hand tool of the like, until said threaded rod is seated in the internally threaded portion of the fluted section of said tap, where said body of the removal tool is slid down the bolt until the flute tabs engage in said flutes of the broken tap, and the nut is rotated down to firmly contact the body of said removal tool and said rubber bushing seats on a upper surface of said broken tap, and where a wrench or hand tool of the like is used to engage and rotate said wrench flats of the removal tool body in the opposite direction the tap was rotated to cut threads in the bore, and the broken tap is removed utilizing at least three points of contact between the removal tool and the broken tap.

* * * * *